United States Patent Office 2,997,933
Patented Aug. 29, 1961

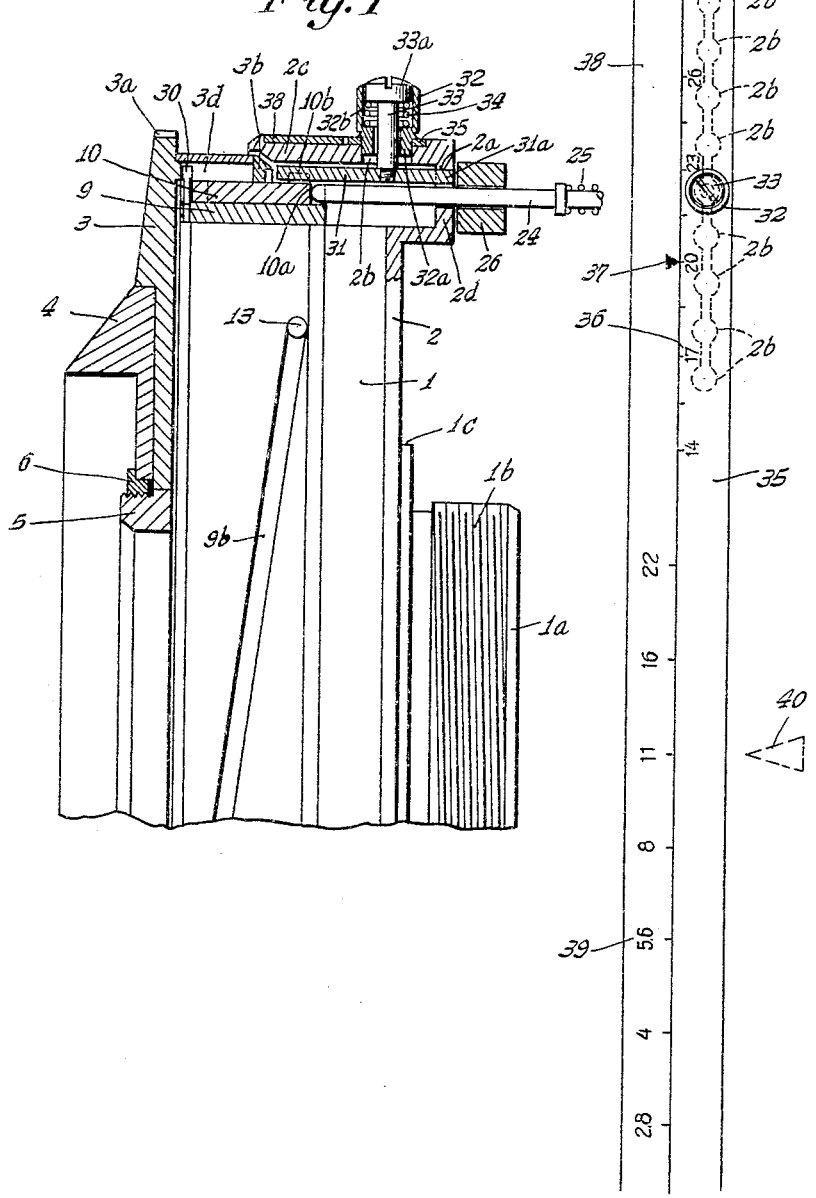

2,997,933
PHOTOGRAPHIC CAMERA WITH COUPLED
EXPOSURE METER
Waldemar T. Rentschler, Calmbach (Enz), Germany, assignor to Alfred Gauthier G.m.b.H., Calmbach (Enz), Germany, a corporation of Germany
Filed June 10, 1958, Ser. No. 741,050
Claims priority, application Germany June 15, 1957
10 Claims. (Cl. 95—10)

This invention relates to photographic cameras, and more particularly to cameras having diaphragm and speed setting members which are coupled with an exposure meter to facilitate the proper setting of the camera for different picture-taking conditions.

The present invention constitutes an improvement on the camera structure disclosed and claimed in my copending application Serial No. 706,023, filed December 30, 1957 and entitled, Photographic Camera with Coupled Exposure Meter.

A camera structure as described in my referred to copending application has the advantage of simplicity and relatively few parts, together with compactness and relatively small size. Moreover, in addition to these there is a special advantage in that a high working accuracy is obtained with a minimum of critical tolerances.

One object of the present invention is to provide an improved and novel camera structure of the above general type, which retains the advantages of simplicity, compactness, and accuracy while at the same time enabling other exposure factors than the picture-taking light conditions to be included in the semi-automatic setting procedure. Such other exposure factors would include those relating to film sensitivity, filter characteristics and the like, and by this invention these other exposure factors may be considered in the setting of the camera in a desirable and advantageous manner as regards simplicity, ease and convenience of operation, and a desirably-high setting accuracy within practical limits.

The above object is accomplished, in accordance with the invention, by the provision of a novel structure including an advantageous releasable coupling means between one of the setting members and the control or coupling ring which heretofore has had but a single relative position with respect to its setting member. Such coupling or control ring is now made to be relatively movable or shiftable, and is adjustable for disposition in a number of different positions with respect to the setting member which influences it. The said control ring, in the illustrated embodiment of the invention, is that one which influences or actuates the tracing or setting member of the exposure meter. Also, there is provided a scale or indicator means between the said one setting ring and the coupling or control ring which is actuated thereby, so as to enable the relative positions of said rings to be indicated in terms of desired factors or data, relating to film sensitivity, filter characteristics and the like. Such indicator means may comprise an index mark cooperable with a suitable scale.

The present improved, adjustable setting and coupling ring combination or assemblage may be readily incorporated in cameras wherein the driving connections between the setting members and the coupling rings associated therewith are effected by straight guides carried by the same. With such organization the relative shifting and positioning of the one coupling ring with respect to its associated setting member is obtainable in a simple manner and with little additional expense, by arranging that part of the straight guide which is normally attached to the setting member so that it is carried on a special, separate support, which is made to be relatively movable with respect to the setting member.

The construction of such special support may be carried out in various ways. In cameras where the setting members are rings which, together with the coupling rings actuated by the setting members, are arranged coaxially with the respect to the shutter axis, the special support may be advantageously constituted as an additional ring which is also coaxially arranged with respect to the shutter axis.

A simple and inexpensive arrangement of the said special support ring is obtained when such ring has a bearing on and is guided by the one setting ring with which it is associated, and which it is actuated by.

In carrying out the invention further, there may be advantageously provided on the said special support ring a manually operable slide having a conveniently arranged handle by which the support ring may be easily shifted and also locked in different adjusted positions with respect to the associated setting ring. Such slide is preferably provided with a spring action, and is cooperable with recesses provided in the setting ring.

An actuating and locking device constituted of a slide and handle as above outlined has the advantage of great simplicity and relatively few parts. Also, it is at all times reliable in its operation and places no undesirable restrictions or limitations on the construction and disposition of the said special support ring.

Where as herein provided the recesses for the slide are provided on a cylindrical mantle which is carried by the setting ring and which overlaps the shutter housing side wall, and where the said slide is arranged to be movable in radial directions there is obtained the advantage of simplicity and reliability of operation, a saving of space, and ruggedness by which the various parts are well adapted to resist strains which may be imposed on them.

Further, in accordance with the invention, a compact and desirable finished construction and appearance of the camera structure is obtained where, as herein provided, the notches for the slide are covered by a band-like cover member which is movable with the special support ring.

The said cover member for the notches may in accordance with the invention be advantageously disposed on the cylindrical mantle of the setting ring and may be constituted as a scale band connected in a novel manner with the special support ring by means of the slide device itself. Such band is then shiftable with respect to the setting ring, and in conjunction therewith may have indicator means including an exposure factor scale, as for example a scale of film sensitivities, providing desired indicators as determined by the relative positions or settings of the special support ring with respect to the one setting member which actuates it.

Moreover, in conjunction with such scale band and indicator means providing the exposure factor scale, there may be advantageously provided an additional fixed scale band on the circumference of the cylindrical mantle of the setting member. Such additional scale band may, for example, carry the setting or index mark of the said indicator means as well as a scale for diaphragm or speed values, which latter scale may cooperate with a fixed mark on the camera structure.

By the present invention it is possible to obtain, in a simple and inexpensive manner, a relatively great path of travel for the coupling rings which actuate the exposure meter tracing member, or more properly the transmission device for such member, and in consequence of such great travel to obtain a high working accuracy of the device, where the camera structure is of the type in which one of the setting rings is arranged at the rear of the shutter housing, said ring overlapping radially the shutter housing side wall and also the associated coupling ring. This is accomplished by extending the said setting ring in an axial rearward direction, well past the rear wall of the shutter housing, and by providing an annular space in said extended portion of the setting ring, which may be occupied by the coupling rings when these are at or near one of the limits of movement thereof. Such coupling rings may then shift axially rearward into the said annular space and beyond the plane of the shutter housing rear wall, accomplishing the above advantageous result while at the same time maintaining the usual overall axial dimensions which are regarded as standard for interchangeable lens and shutter assemblies.

In the accompanying drawings there is illustrated one embodiment of the invention.

FIGURE 1 is an enlarged fragmentary axial sectional view of a photographic lens shutter having incorporated therein coupling rings actuated by speed and diaphragm setting rings for effecting an actuation of an exposure meter tracing member. The structure of FIG. 1 further discloses the present improved organization or assemblage of setting ring and coupling ring which are relatively adjustable and which may be locked in different adjusted positions, thereby to enable further exposure factors to be taken into consideration in setting the camera for the taking of a picture.

FIG. 2 is a diagrammatic representation of the indicator means or scales, laid out in developed form, as provided on the relatively adjustable parts or rings shown in FIG. 1.

In the drawings, components which are similar generally to those illustrated and described in my copending application above referred to have been given like reference characters.

As in my copending application referred to, the numeral 1 in FIG. 1 indicates the housing of a photographic lens shutter. At the rear of the housing 1 there is a nozzle 1a which serves to attach the housing, shutter and lens assembly to the camera body. The nozzle 1a has the usual external threads 1b, and is adapted to carry a lock nut or ring (not shown) by which the shutter and lens assembly is secured in the well known manner. As in my copending application, at the rear of the shutter and lens assembly there is provided a bearing shoulder 1c which rotatably mounts a diaphragm setting ring 2. At the front of the shutter housing 1 there is located a speed setting ring 3, having a knurled periphery or rim 3a. For holding the speed setting ring 3 in position there is provided a front plate 4, which is retained by a threaded ring 6 screwed onto the nozzle 5 of the shutter base plate. Such base plate is not shown in detail, and carries in a well known manner the various parts of the shutter mechanism.

Complete details by which the diaphragm setting ring 2 and the speed setting ring 3 (which rings are relatively movable) are coupled with the tracing or setting member of a well known exposure meter which is carried by the camera body (not shown) are given in FIGURES 2 to 4 of my copending application referred to, and such complete details are not presented herein since they are considered unnecessary to a complete understanding of the invention.

Included in the means which couples the relatively movable diaphragm and speed setting members 2 and 3 (which are movable independently of each other) to the exposure meter, as illustrated in my copending application, is a first coupling ring 9 which bears on the cylindrical side wall (not shown) of the shutter housing 1, said ring being shiftable axially by means of a cam control device comprising cam slots 9b which are provided in the ring and which receive pins 13 mounted on the said shutter housing side wall. Such axial movement is effected in response to turning of the ring 9, as accomplished by turning movement of the speed setting ring 3. There is also provided a second coupling ring 10 extending around and bearing on the first coupling ring 9, the latter being provided with a suitable means (not shown here) by which relative axial movement between rings 9 and 10 is prevented while permitting relative turning movement of such rings. That is, a positive drive is established between the rings 9 and 10, as regards axial movement, by the said suitable means while at the same time such rings are freely turnable with respect to each other. Actuation of the exposure meter tracing or setting member (not shown) in response to axial and/or turning movement of the coupling ring 10 is effected by a transmission device comprising a longitudinally movable cylindrical pin 24 normally urged by a spring 25 to the left as viewed in FIG. 1, the left-most end of such pin engaging a cam surface 10a of the coupling ring 10. The pin 24 may have a bearing in a sleeve or guide 26, and may be connected either through means (not shown) comprising a positive drive or else an abutting connection dependent on spring power, with the said tracing or setting member of the exposure meter.

In the camera structure of my copending application referred to, fixed and unchangeable driving connections exist between the diaphragm and speed setting rings and the coupling rings respectively, and in consequence there is taken into consideration only the light conditions given by the exposure meter.

In accordance with the present invention I provide a novel means by which additional exposure factors may be taken into consideration when setting the camera by means of the diaphragm and speed setting members 2 and 3. Such additional exposure factors may for example be film sensitivity or filter characteristics. In accomplishing this object at least one of the setting rings 2, 3 is made to be relatively shiftable with respect to its associated coupling ring 10, 9 which is included in the coupling or transmission means between the setting members and the tracing or setting member of the exposure member. Preferably the said relatively shiftable coupling ring may be fixed or locked in different relative positions with respect to its associated ring. In conjunction with such relative shifting movement and locking of the coupling and setting rings I further provide an indicator means including a setting scale and indicator or index mark, by which the relative positions of the setting and coupling rings may be translated into additional exposure factors involving, for example, film sensitivity or filter characteristics.

In the illustrated embodiment of the invention the coupling ring 10 is made to be shiftable with respect to the diaphragm setting ring 2 which actuates the said coupling ring.

However, in place of or in addition to such adjustability, the coupling ring 9 may be shiftably related to the speed setting ring 3.

Where the two coupling rings are adjustable with respect to their associated setting rings not only may film sensitivity or like film factors be considered but also filter factors as well, in a simple and easily understood manner. By means broadly similar to that shown in my copending application referred to, the driving connections between the coupling ring 9 and speed setting ring 3 and between the coupling ring 10 and diaphragm setting ring 2 may be effected, through the use of straight guides disposed between the said associated rings. Such straight guides may comprise a projection in the form of a lug or pin on one ring, engaged in a slot provided in the other or associated ring. Considering the speed setting ring 3 there is provided at the inner circumference of a cylindrical mantle 3b of such ring a guide slot indicated by the numeral 3d, such slot receiving a pin 30 which is carried by the coupling ring 9. The cylindrical mantle 3b, as will be understood, overlaps radially the forward portion of the cylindrical shutter housing 1.

In accordance with the present invention the straight guide associated with the diaphragm setting ring 2 and the coupling ring 10 actuated thereby may comprise a lug or projection 10b on the ring 10, which is received in a cooperable slot provided on a special support member or ring 31 adapted to be driven or actuated by the diaphragm setting ring 2 and arranged to be releasably coupled to said setting ring. In the illustrated embodiment of the invention such support is advantageously constituted as a ring which is arranged co-axially with respect to the shutter axis. By making the support 31 in the form of a ring coaxial with the shutter axis and with the diaphragm and speed setting rings 2 and 3 there result special advantages with regard to the bearing and guiding of the support, as well as with regard to its cooperation with the diaphragm setting ring 2 on the one hand and the coupling ring 10 on the other hand.

By the provision of the special, separate support member or ring 31, constituted as a support for part of the straight guide between the diaphragm setting ring 2 and the coupling ring 10 the effecting of different relative positions between the coupling ring and diaphragm setting ring may be accomplished in a simple and inexpensive manner. This results from the fact that the manufacture of the straight guide, which could require very careful execution to prevent inaccuracy and malfunctioning of the device, does not involve any greater expense than that which would be required if no adjustable positioning means were provided between the setting and coupling rings. It should be here noted that the matter of providing a disengageable connection between the special support member or ring 31 and the diaphragm setting ring 2 is something that may be easily and economically effected. Thus, by the above organization for all relative settings between the diaphragm setting ring 2 and the coupling ring 10 the operation of the straight guide associated with the rings 10 and 31 is unchanged or what might be normally expected. Therefore, for all such relative positionings there is possible the greatest working accuracy and reliability of the device.

The construction and mounting of the special support ring 31, in the illustrated embodiment of the invention, is especially simple, reliable and compact. As shown, the ring 31 may have a bearing on and may be guided by the diaphragm setting ring 2 itself. For the purpose of a radial guide, one or several slots 2a may be provided in the diaphragm ring 2, and end projections 31a may be provided on the special support ring 31, for reception in the slots 2a. Also, axial positioning of the special support ring 31 with respect to the diaphragm setting ring 2 may be simply and reliably effected by the provision of a slide 32 which is cooperable with the diaphragm setting ring 2, as will be described in greater detail below.

As already mentioned above, the coupling ring 10 may be locked in different relative adjusted positions with respect to the diaphragm setting ring 2, and by virtue of such locking there is prevented any inadvertent or unintentional shifting of the ring 10 with respect to the diaphragm setting ring 2, which might cause wrong settings or indications.

In the illustrated embodiment of the invention each locking of the diaphragm setting ring 2 and the coupling ring 10 is effected by a slide button 32 carried by the special support ring 31. The said slide button 32 is engageable, under spring action, with notches 2b provided in the diaphragm setting ring 2 and may be advantageously provided with a handle by which the button may be conveniently operated so that it not only effects the locking action but also enables the coupling ring 10 to be readily adjusted or positioned through shifting of the special support ring 31. The said slide and handle are preferably made of a single piece, and constituted as a cylindrical bushing 32. Said bushing is movably carried by a screw 33 which is threaded into and affixed to the special support ring 31, as shown. A helical compression spring 34 normally urges the slide bushing 32 downward, as viewed in FIG. 1, thereby maintaining an end portion 32a of such bushing engaged with the edges of and disposed in any one of a plurality of circular notches 2b provided in the diaphragm setting ring 2. The compression spring 34 is thus concealed from the exterior, being arranged in a recess 32b in the slide bushing and being supported against a shoulder in said recess and against the head 33a of the screw 33.

By the provision of the slide 32 on the special support ring 31 the latter may be advantageously completely enclosed and hidden from view. Moreover, by the provision of the compression spring 34 which keeps the slide bushing 32 engaged with one of the notches 2b the adjustment and locking of the coupling ring 10 with respect to the diaphragm setting ring 2 is made especially simple and secure.

In the illustrated embodiment of the invention the notches 2b which are provided in the diaphragm setting ring 2 for the slide bushing 32 may be advantageously located in a cylindrical mantle 2c which is carried by the diaphragm setting ring and which overlaps radially the shutter housing side wall and the special support ring 31. With such arrangement the engagement and disengagement of the slide 32 with any one of the notches 2b is effected by radial movement of the slide. This organization enables the slide to be readily accessible and also provides for a saving of space and a desirable compactness.

It will be now understood from a consideration of FIG. 1 that when the button 32 is in the position shown the diaphragm setting ring 2 is coupled to the support ring 31 by virtue of the button 32 occupying one of the notches 2b of the diaphragm setting ring, such button being carried by the screw 33 which is rigid on the support ring 31. Since the support ring 31 is coupled for turning movement at all times with the second coupling ring 10 which has the cam edge 10a engageable with the transmission pin 24, a turning movement imparted to the diaphragm setting ring 2 will now result in turning of the coupling ring 10 and axial movement of the transmission pin 24. When the button 32 is lifted, compressing the spring 24, it will become disengaged from the notch 2b which it has occupied. Upon such button being held in its raised position, it may now be shifted circumferentially of the shutter axis, and upon being released will enter another of the notches 2b. Such shifting of the lifted button 32 will effect a turning of the support ring 31 while the diaphragm setting ring 2 remains at a standstill. Accordingly, a different relative position is thus effected between the diaphragm setting ring 2 on the one hand and the support ring 31 and second coupling ring 10 on the other hand. The band 35 will at all times remain keyed to the button 32 and the support ring 31, and will turn simultaneously with the support ring 31 and the second coupling ring 10.

In order that the shutter structure contained in the housing 1 is not adversely affected by the open arrangement provided by the notches 2b in the diaphragm setting ring 2, I provide a novel and simplified cover means by which the said notches are entirely enclosed, such cover means being constituted of a part which is shiftable with the special support ring 31 as a unit. Such cover means or part may be constituted as a scale band 35 which encircles the circumference of the cylindrical mantle 2c. The scale band 35 may be connected with the special support ring 31 by a positive driving connection, through the medium of the slide bushing 32 in the manner shown in FIG. 1, thereby to be shiftable with the special support ring 31 as a unit. For taking into consideration exposure factors such as film sensitivity, the scale band 35 may be provided with a film sensitivity scale 36, FIG. 2, such scale cooperating with a mark or index 37 which is fixed with respect to the diaphragm setting ring 2. The index mark 37 may be carried by an additional scale band 38 which is disposed adjacent the scale band 35 on the circumference on the cylindrical mantle 2c. Beside the index mark 37 for the film sensitivity scale 36, the scale band 38 may carry a diaphragm scale 39 adapted to cooperate with a fixed index mark which is arranged for example on the camera housing or body.

By the provision of the special scale bands 35 and 38 for carrying the scales 36 and 39, together with the index mark 37, such scales and index mark may be readily provided by well-known etching procedures, and may be colored or otherwise distinguished to enhance their readability.

In shutters of the kind illustrated herewith, wherein one of the setting rings, in this case the diaphragm setting ring 2, is arranged at the rear of the shutter housing 1 and overlaps radially the cylindrical side wall of the shutter housing and also the coupling ring 10 co-ordinated with the setting ring, the path of movement of the coupling rings 9 and 10 is limited in an axial direction by the setting ring 2. However, in accordance with the invention, the said rear setting ring 2 is so arranged and organized that the coupling rings 9 and 10 may have an extended or increased path or movement, rearward and beyond the plane formed by the shutter housing rear wall, while at the same time the axial dimensions which are important for mounting of the lenses into the shutter are kept unchanged, adhering to common, standard-like conditions. This is accomplished in a simple manner by offsetting in a rearward direction that part of the diaphragm setting ring 2 which normally overlaps the cylindrical side wall of the shutter housing 1. That is, the outer part of the diaphragm setting 2 is displaced axially rearward, providing an annular space within such ring which may be occupied by the coupling rings 9 and 10 when the latter are at or near one extremity at their movement. Thus, the coupling rings 9 and 10 may be shifted rearward beyond the plane of the rear wall of the shutter housing, into the stepped or rearwardly displaced portion 2d of the diaphragm setting ring 2.

By such organization, in accordance with the invention, there is provided for the coupling rings 9 and 10 a path of movement which is greater than the height or front-to-rear dimension of the cylindrical side wall of the shutter housing 1. Thus, with a high degree of accuracy, a large scope or range of exposure factors may be taken into consideration, because for each relative adjusted position of the coupling ring 10 with respect to the diaphragm setting ring 2 a comparatively great axial path of movement of the coupling rings 9 and 10 is possible. However, by the above organization the front-to-rear dimensions of the shutter assembly, which are important for mounting of the assembly, and also the rear supporting surface of the assembly which serves for connection with the camera body, are not altered since the projected portion 2d of the diaphragm setting ring 2 extends in a rearward direction where space is available at the camera, without difficulty.

The operation of a camera employing the improved setting device of the present invention, where only a fixed film sensitivity is involved, is similar to that described in detail in my copending application above referred to.

Thus, in order to set a time-diaphragm ratio at the shutter, which corresponds to the picture-taking light conditions, either the diaphragm setting ring 2 or the speed setting ring 3 is turned until a coincidence is effected between an index mark and a tracing or setting member disposed at the exposure meter carried by the camera body.

If, however, a film is to be used which has a sensitivity different from one previously used, this sensitivity is now taken into consideration as follows:

The slide 32 is moved by pulling the handle thereof radially outward against the action of the spring 34 until the inner end 32a of the slide bushing becomes disengaged from the notch 2b of the diaphragm setting ring 2. Then, by means of this slide, the assemblage constituted of the coupling ring 10, the special support ring 31 and the scale band 35 is shifted with respect to the diaphragm setting ring 2 until the proper film-sensitivity number on the scale 36 is made to correspond with the index mark 37 on the scale band 38. Such shifting will effect a movement of the transmission pin 24 in consequence of the turning movement of the coupling ring 10 and the movement of the control cam 10a carried thereby.

In order to re-establish the driving connection between the diaphragm setting ring 2 and the coupling ring 10 it is now merely necessary to release the slide 32, whereupon the spring 34 will cause engagement of such slide with one of the notches 2b. Thus the coupling ring 10 is locked with the diaphragm setting ring 2 in a new adjusted relative position.

It will now be understood, as effected by the illustrated embodiment of the invention, that the invention provides a photographic camera with coupled exposure meter which retains all of the advantages of the structure disclosed in my copending application referred to while at the same time enabling further factors to be taken into consideration, as for example film sensitivity values and filter characteristics. Actuation of the tracing or setting member of the exposure meter is accomplished by adjustment of the diaphragm and speed setting members 2, 3 either with respect to each other or as a unit, such adjustment actuating the coupling rings, 9, 10 to effect a longitudinal adjustment of the transmission pin 24, as is well understood from the description set forth in my copending application. Additionally, however, it is now possible to take into consideration the additional factors of film sensitivity or filter characteristics by effecting a relative adjustment between the coupling ring 10 and the diaphragm setting ring 2 which normally actuates or drives the coupling ring. Such relative adjustment is effected in a simple and easily understood manner, utilizing relatively few parts in a simple and economical construction, and without requiring excessive additional space which might complicate the use of the device or render the same impractical.

As with the device of my copending application, the exposure meter carried by the camera body may be completely enclosed and not accessbile to the operator, since all factors which influence the exposure setting are adjusted from outside the exposure meter This is advantageous in maintaining a reliable operation of the exposure meter, and of the camera strructure generally. Moreover, with the device of the present invention the additional exposure factors may be taken into consideration in a simple and readily understood manner, because the setting scales for such factors are provided at an accessible location, adjacent the setting members for the diaphragm and speed.

Variations and modifications may be made within the scope of the claims, and portions of the improvement may be used without others.

I claim:

1. In a photographic camera, a speed setting member and a diaphragm setting member; a transmission device adapted for connection with an exposure meter to influence a movable part thereof; means including a coupling ring, for actuating said transmission device in response to relative movement between said setting members, said ring being normally turnable as a unit with one of said members; manually operable, releasable coupling means for adjustably positioning said ring with respect to and for locking it to said one setting member in different adjusted rotative positions and against relative turning movement; and means including a scale for indicating the different relative adjusted positions of the ring and one setting member.

2. The invention as defined in claim 1 in which the means for actuating the transmission device includes another coupling ring, said coupling rings being associated with the setting members for simultaneous movement therewith, and includes a special support and plural-part straight guides between said coupling rings and members, a part of said straight guides being arranged at said special support.

3. The invention as defined in claim 2 in which the setting members are rings which together with the coupling rings are coaxial with the shutter axis, and in which the special support comprises a support ring which is also coaxial with the shutter axis.

4. The invention as defined in claim 3 in which the support ring is supported and guided by the setitng ring with which it is associated.

5. The invention as defined in claim 4 in which the releasable coupling means includes a slide carried on the means for actuating the transmission device, said slide having a handle and a spring means biasing the slide, and in which the said one setting member has recesses adapted to receive the slide.

6. The invention as defined in claim 5 in which the one setting member has a cylindrical mantle adapted to overlap the shutter housing, said recesses being disposed in the cylindrical mantle and said slide being movable in radial directions with respect to the mantle.

7. The invention as defined in claim 6 in which there is a cylindrical cover part extending over said mantle and movable with said support ring, said slide extending through said cover part and the latter covering the said recesses in the mantle.

8. The invention as defined in claim 7 in which there is a scale band extending around the cylindrical mantle and connected with the support ring to move therewith and with respect to the one setting member, said band and setting member having cooperable indicator means including an exposure factor scale.

9. The invention as defined in claim 8 in which the cooperable indicator means includes a second scale band, disposed on the said cylindrical mantle adjacent the first-mentioned band, said second scale band also having an exposure setting scale coordinated to the said one setting member.

10. The invention as defined in claim 6 in which one setting ring is arranged at the rear of the shutter housing and has a rearwardly projecting stepped part which overlaps radially the shutter housing side wall and coupling ring associated with the setting ring, and extends rearward of the shutter housing rear wall, the paths of movement of said coupling rings extending rearward beyond the plane of said shutter housing rear wall.

References Cited in the file of this patent

UNITED STATES PATENTS

| | | |
|---|---|---|
| 2,343,257 | Hineline | Mar. 7, 1944 |
| 2,418,370 | Simmon | Apr. 1, 1947 |
| 2,596,328 | Dorsey | May 13, 1952 |

FOREIGN PATENTS

| | | |
|---|---|---|
| 756,282 | Germany | Feb. 23, 1953 |